United States Patent [19]

Burg et al.

[11] Patent Number: 5,633,486

[45] Date of Patent: May 27, 1997

[54] APPARATUS FOR SENSING MAGNETIC FIELDS FROM A WIDE RANGE OF MAGNETIC MEDIA

[75] Inventors: Gregory A. Burg, San Diego; Frederick R. Chamberlain, IV, Vista, both of Calif.

[73] Assignee: Eastman Kodak Company, Rochester, N.Y.

[21] Appl. No.: 444,488

[22] Filed: May 19, 1995

[51] Int. Cl.$^6$ ........................................ G06K 7/08
[52] U.S. Cl. ........................................... 235/449
[58] Field of Search ................................. 235/449

[56] References Cited

U.S. PATENT DOCUMENTS 3,860,965  1/1975  Voegeli ..................... 360/113
4,246,473  1/1981  Maussion .................. 235/449
4,447,781  5/1984  vanDyke ................. 324/76.83
4,524,401  6/1985  Uchida et al. ............. 360/113

FOREIGN PATENT DOCUMENTS 54-124962  9/1979  Japan ....................... 235/449
1-180080   7/1989  Japan ....................... 235/449

Primary Examiner—John Shepperd
Attorney, Agent, or Firm—William F. Noval

[57] ABSTRACT

Apparatus for reading magnetically stored data from a wide range of magnetic media. The apparatus includes a magnetoresistive MR head for producing a signal representative of stored magnetic data and a hysteresis comparator circuit for processing the signal from high concentration media. The MR head is preferably a paired MR head having a preamplifier circuit which provides the bias current for the PMR head, amplifies the signal produced by the PMR head, and provides rejection of common mode signals.

7 Claims, 8 Drawing Sheets

APPARATUS FOR SENSING MAGNETIC FIELDS FROM A WIDE RANGE OF MAGNETIC MEDIA

FIELD OF INVENTION

The invention generally relates to the reading of magnetically stored data, and more specifically relates to the use of a magneto-resistive (MR) head to read data from a wide range of different magnetic media.

DESCRIPTION OF THE PRIOR ART

It is known to use magneto-resistive materials as the active element in magnetic recording read heads. Magneto-resistive materials have the property that their resistivity is a function angle between the current density and the magnetization vector in the material.

A known type of MR head is the paired MR head illustrated in FIG. 1 (See U.S. Pat. No. 3,860,965, issued Jan. 14, 1975, inventor Voegeli). As shown, two parallel stripes of magnetoresistive elements 2 and 4, separated by insulator 5, are connected as shown to resistors 10 and 12, and connected to a voltage source 6 and ground 8 as shown. MR elements 2, 4 sense magnetic fields from data recorded on magnetic media 7. It will be appreciated that the two stripes may be connected together on the head and a single wire brought out to point 8, or two wires may be used to connect each MR element to point 8. The voltage at 22 and 24 is differentially amplified by amplifier 14 and the signal is output at 16. Current flowing in each MR element generates magnetic bias fields 18 and 20 which serve to set the magnetization in each MR element to approximately 45 degrees from the direction of the current flow.

This method of bias shifts the resistance vs. applied field characteristic of each MR element as shown in FIG. 2. Curves 32 and 34 represent the change in resistance of elements 2 and 4 respectively.

The voltage output at point 16 is a function of the difference between the two MR resistances and is shown by curve 40 in FIG. 3.

A magneto-resistive read head is generally designed and optimized to read from a single specific recording medium. Operating such a head with a medium of higher magnetic strength than that for which it was designed results in non-linearity and distortion. If the field is large enough, the MR sensor saturates. Saturation is reached when further increase in magnetic field results in no change of the output signal. Generally an MR read head is designed to avoid saturation.

Uchida et al. (U.S. Pat. No. 4,524,401) describes an MR which is operated in partial saturation in order to increase the sensitivity of the sensor at the edge of the sensor. The middle of the MR sensor is saturated by a DC bias field, which leaves a thin strip along the sensor edge sensitive to magnetic fields from the media, increasing the sensor's short wavelength capability. There is no disclosure in this patent in which the AC field from magnetic transitions in the media alternately swings the MR sensor between positive and negative saturation limits.

Martin J. van Dyke (U.S. Pat. No. 4,447,781) describes a transducer with MR sensors which operate between saturation limits, but for the purpose of detecting zero crossings in the AC current carried by electrical power conductors.

There thus exists a need for an MR head assembly which is capable of reading data from a wide range of magnetic media.

SUMMARY OF THE INVENTION

According to the present invention, there is provided a solution to satisfy such need. The object of the present invention is to enable a single MR read head to be used with a wide range of different magnetic storage media. In particular, it will enable a single MR head to read information from a variety of different types of magnetically encoded cards.

According to one feature of the present invention, there is provided a paired MR sensor which is connected to an amplifier circuit, and a hysteresis comparator to convert the signal of the paired MR sensor reading magnetic media into a signal which can then be decoded.

ADVANTAGEOUS EFFECT OF THE INVENTION

The invention provides the ability for an MR head to read data from a variety of different media. This reduces the cost of a reader designed to work with several different types of magnetically encoded cards.

When operating exclusively in the saturated mode with high concentration magnetic media, the sense current in the paired magnetoresistor can be reduced within limits imposed by the minimum required signal to noise ratio, thereby reducing the thermal heating of the paired MR

DETAILED DESCRIPTION OF THE PREFERRED EMBODIMENTS

Figure 4:
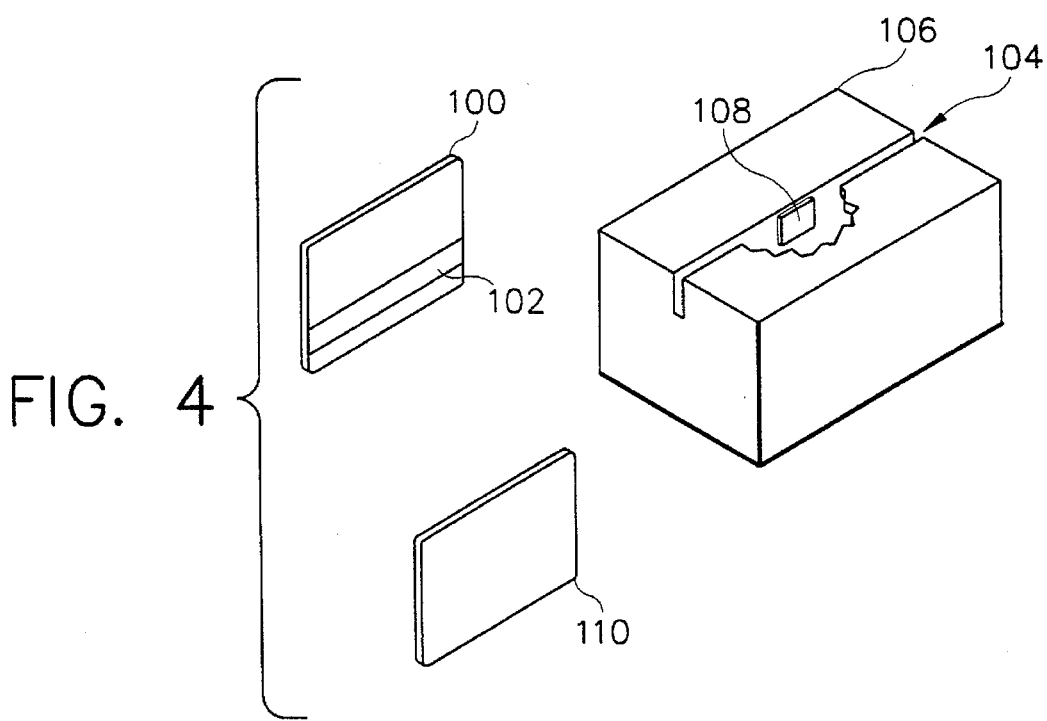
FIG. 4 is a perspective view of a card reader and two different magnetic cards.

According to the present invention, there is provided a MR head system for reading data from a wide range of different magnetic media, such as magnetically encodable cards. As shown in FIG. 4, a conventional magnetically encodable card 100 (such as a credit card, debit card, personal identification card, employee pass, security card, door access card, plastic money, casino chip card, etc.) contains a magnetic strip 102 for recording magnetically encoded data. In order to read the data encoded on card 100, card 100 is swiped through reading slot 104 of card reader 106 having read head assembly 108. Typically, the magnetic data is recorded on stripe 102 having a high concentration and assembly 108 has an inductive magnetic read head.

Because of several disadvantages of the conventional magnetically encodable card 100 (degradation of recorded data after repeated swiping through a reader 106, limited recording capacity, ease of copying to produce counterfeits, ease of erasure) there has been proposed in U.S. patent application Ser. No. 08/418,336, filed Apr. 7, 1995, inventors Jagielinski et al., a magnetically encodable card 100 having magnetic pigment uniformly dispersed in plastic that can have a low concentration. The conventional card reader 106 with an inductive magnetic head in assembly 108 designed to read high concentration cards could not read such a low concentration card. According to the present invention, reader 106 is provided with a MR head in head assembly 108 with circuitry which can read both a high concentration card 100 and low concentration card 110.

Figure 1:
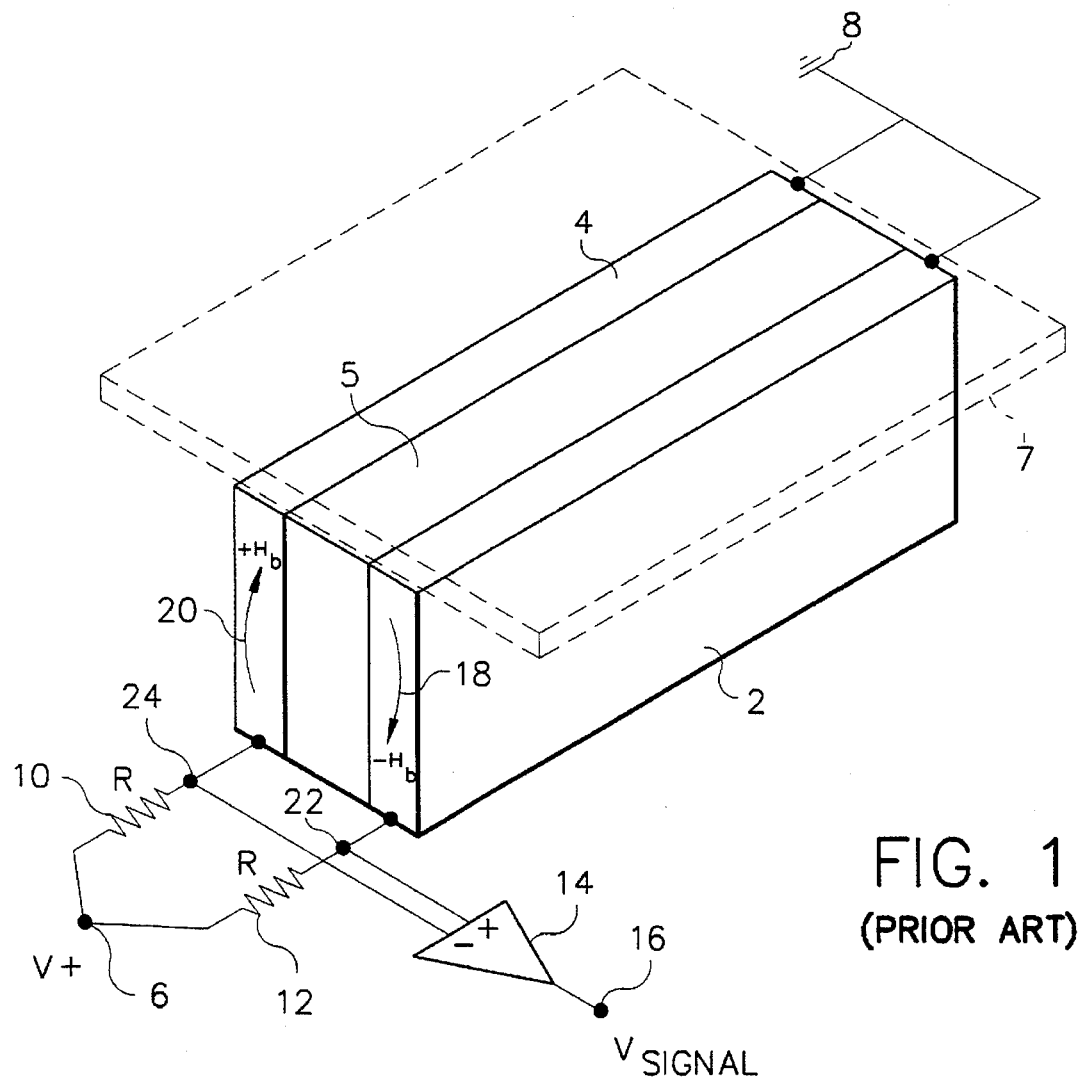
FIG. 1 is an illustration of the paired MR sensor and bridge circuit of the prior art.
Figure 2:
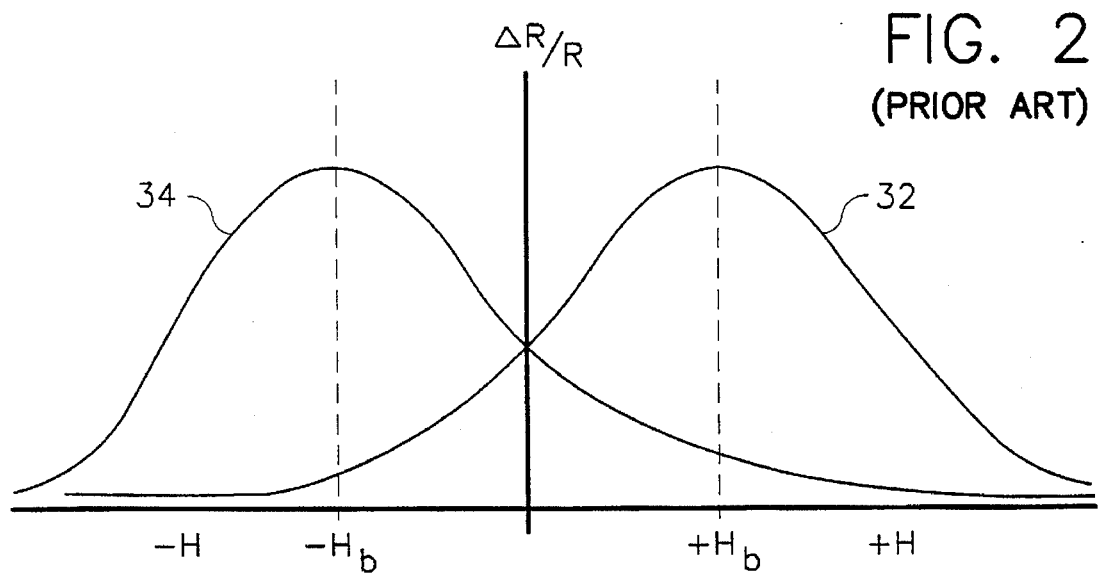
FIG. 2 is a graph of the resistance vs. applied external field of the individual MR elements of the circuit of FIG. 1.
Figure 3:
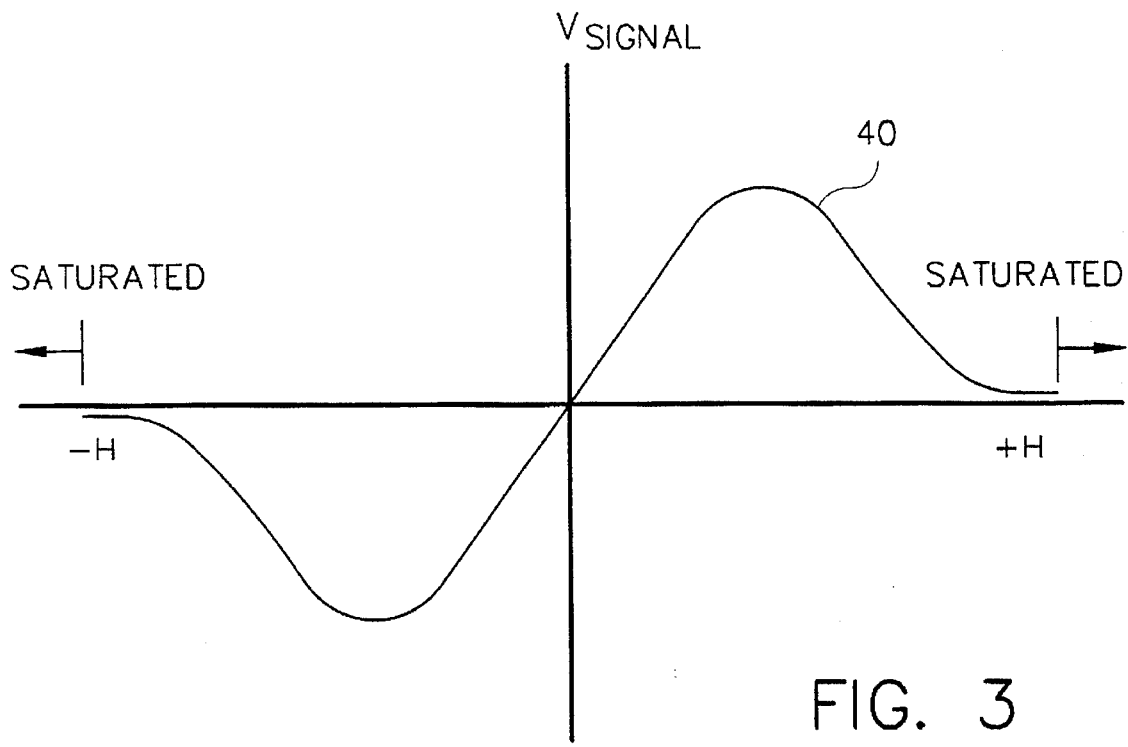
FIG. 3 is a graph of voltage output of the paired MR when wired in a bridge configuration as shown in the circuit of FIG. 1.
Figure 5:
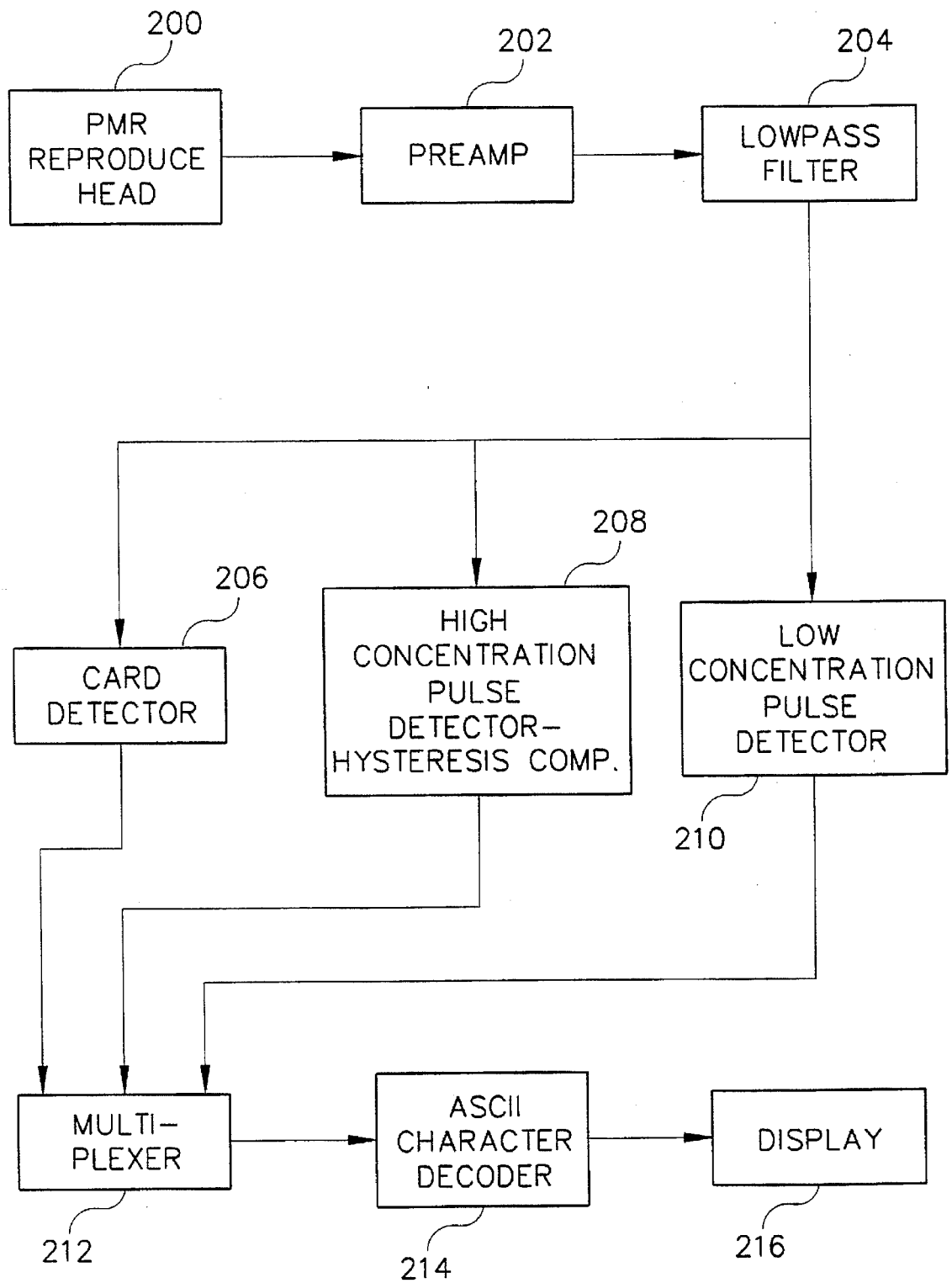
FIG. 5 is a block diagram of a system incorporating the present invention.

Referring to FIG. 5, there is shown a block diagram of a MR head system incorporating an embodiment of the present invention. As shown, a paired magnetoresistive PMR reproduce head (such as shown in FIG. 1) 200 produces a signal which is amplified in Preamp 202 and filtered by Lowpass Filter 204. PMR reproduce head 200 is capable of reading both low and high concentration magnetically encodable cards (100, 110—FIG. 4). The signal from Lowpass Filter 204 is supplied to Card Detector 206, High Concentration Pulse Detector 208, and Low Concentration Pulse Detector 210. The system also includes Multiplexer 212, ASCII Character Decoder 214 and Display 216.

The card detector 206 consists of two comparators (one threshold is set for the high concentration card and the other is set at for the low concentration card). If a high concentration credit card is swiped through the card reader, the amplitude of the signal will be greater than the threshold set for the high concentration card. This switches the Multiplexer 212 to connect the signals from the "HIGH CONCENTRATION PULSE DETECTOR" 208 to the "ASCII CHARACTER DECODER" 214. On the contrary, if a low concentration credit card is swiped through the card reader, the amplitude of the signal will be greater than the threshold for the low concentration card, but less than the threshold for the high concentration card. This switches the Multiplexer 212 to connect signals from the "LOW CONCENTRATION PULSE DETECTOR" 210 to the "ASCII CHARACTER DECODER" 214. The output of Decoder 214 is sent to Display 216.

Figure 11:
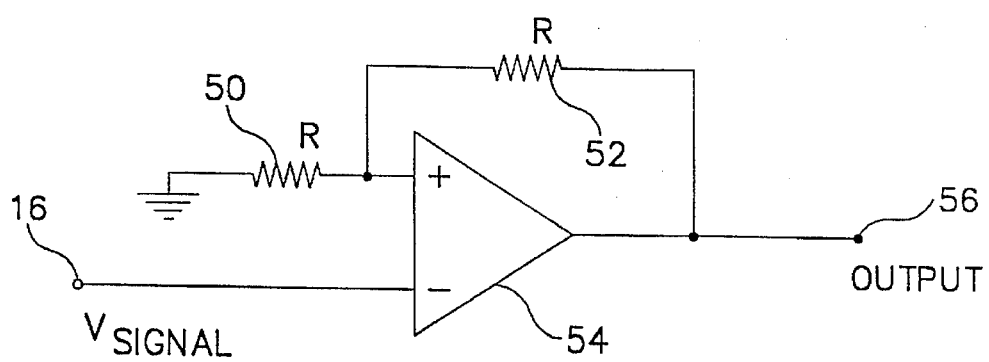

According to one aspect of the present invention, the voltage output 16 is processed by a hysteretic comparator circuit, diagrammed in FIG. 11. The hysteretic compartor circuit is used only in the high concentration pulse detector circuit. Starting with the output state low, this circuit holds the output low until the input drops below the lower threshold voltage determined by resistors 50 and 52 and the value of the output voltage. The output of the hysteretic comparator remains low until the amplitude of the input exceeds the upper threshold. At this point, the output of the hysteretic comparator switches high.

Figure 7:
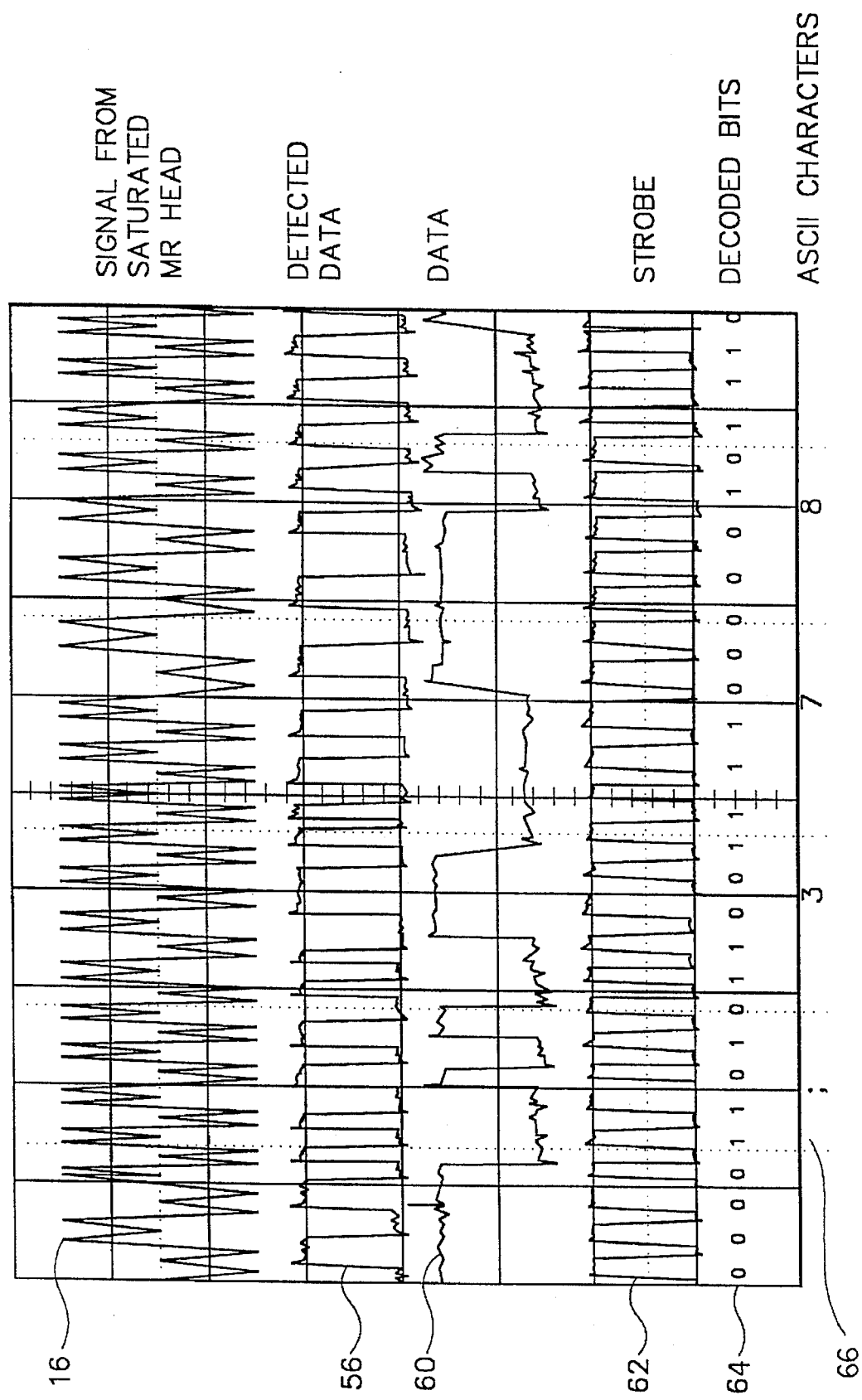
FIGS. 7, 8, and 9 are graphs useful in describing the operation of the present invention.

FIG. 7 shows data from a working prototype of the invention. The first curve shows the Signal 16 of a paired MR head reading high concentration media which saturated the head. Saturation is evident from the fact that the signal for each magnetic transition has two peaks. The double peak is caused by applying a field which is much larger than the bias field and the return to zero field.

The second curve in FIG. 7 shows the output of the comparator circuit, 56. The comparator circuit enables the second peak caused by each transition saturating the MR to be ignored.

The third and forth curves, 60 and 62, and the strings of characters, 64 and 66, demonstrate the use of the comparator output, 56, to decode the magnetically stored information in a standard manner known by those skilled in the art of magnetic recording.

Figure 8A:
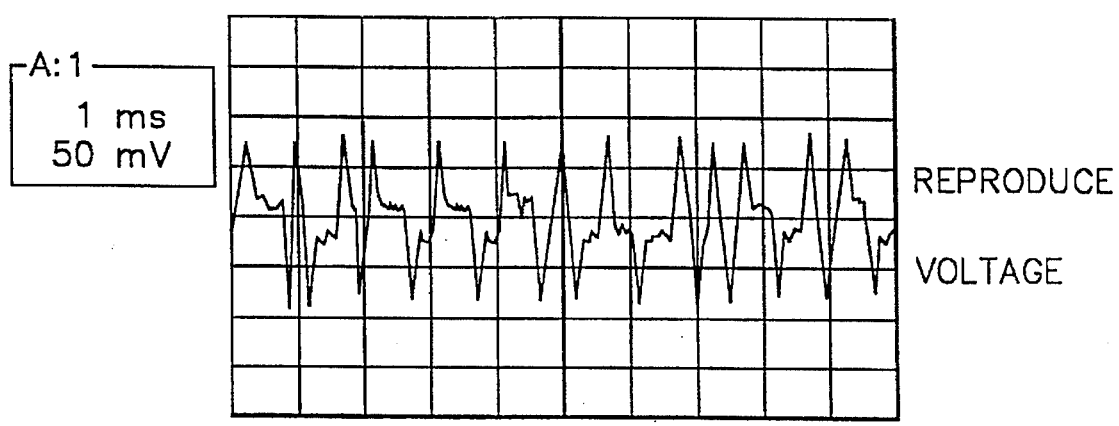
Figure 8B:
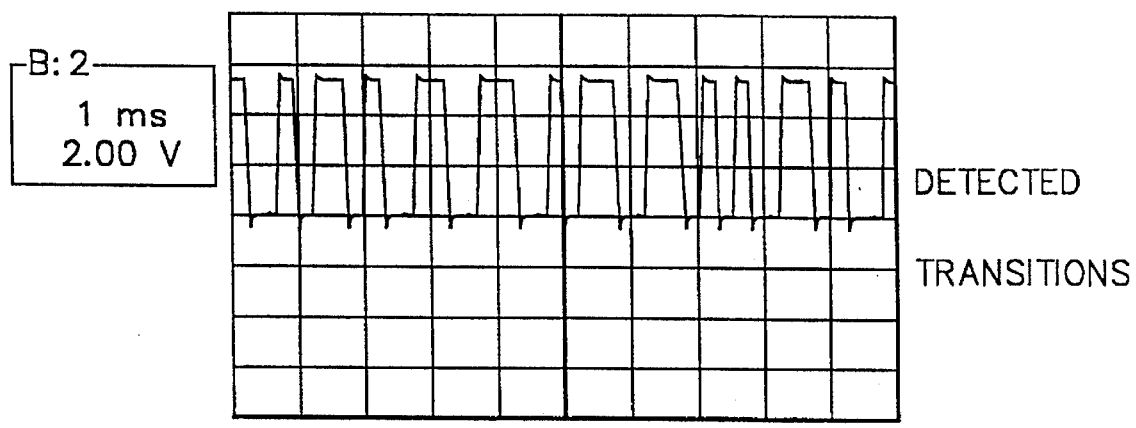
Figure 9A:
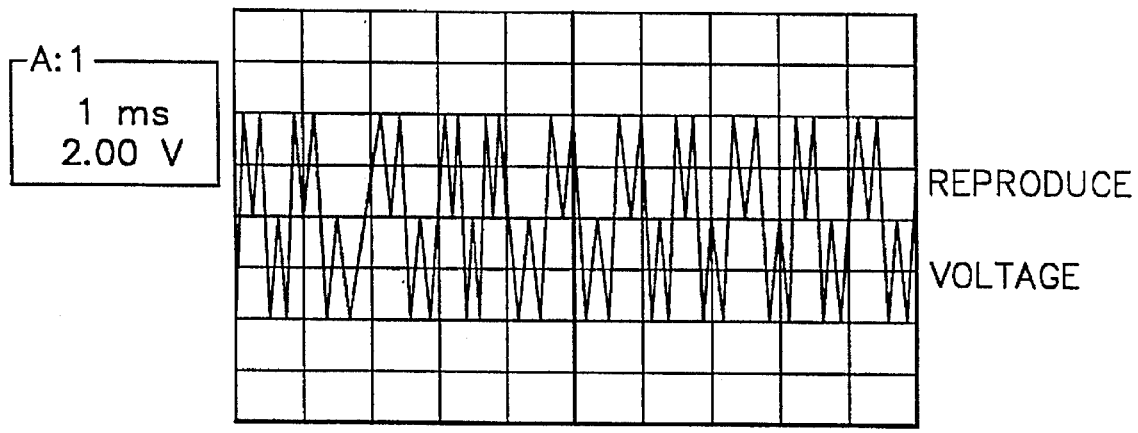
Figure 9B:
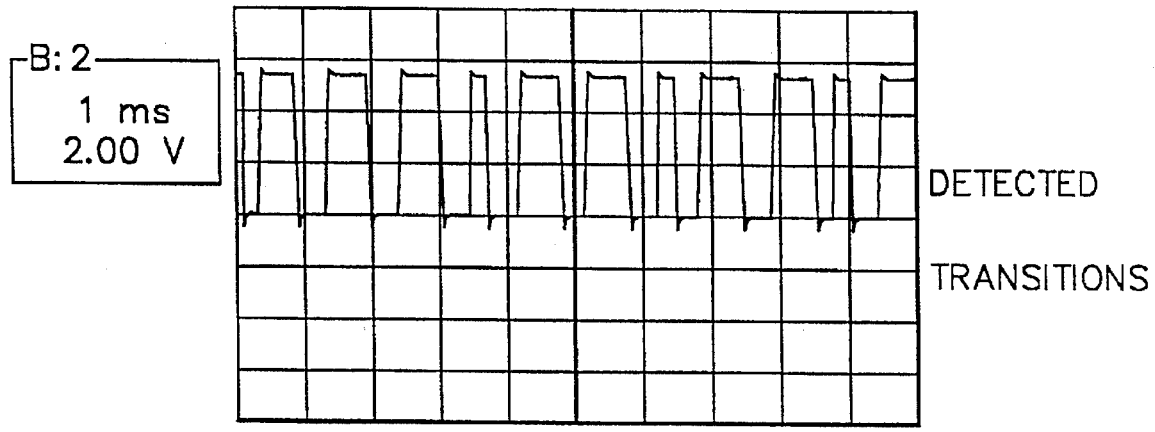

FIG. 8 shows the reproduce voltage and detected transitions from a low concentration card (FIG. 4, card 100). FIG. 9 shows the reproduce voltage and detected transitions from a high concentration card (FIG. 4, card 110).

Figure 6:
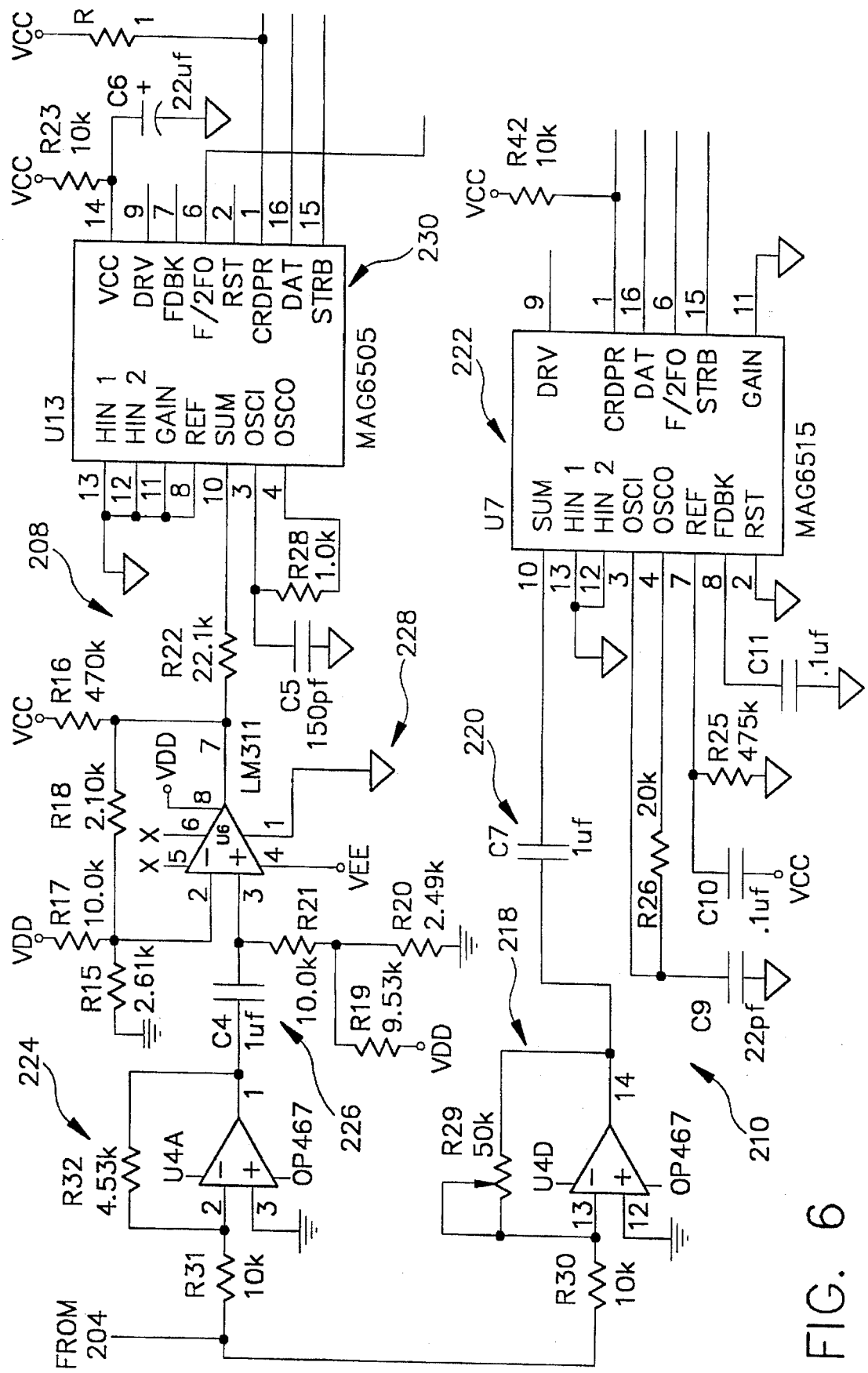
FIGS. 6, 10 and 11 are schematic diagrams of elements of FIG. 5.

Referring now to FIG. 6, there is shown a schematic diagram of detectors 208 and 210 shown in FIG. 5. As shown, Low Concentration Pulse Detector 210 includes a buffer amplifier 218, A.C. Coupling Capacitor 220 and F/2F Read/Decode Integrated Circuit 222. The output of Circuit 222 is supplied to Multiplexer 212 (FIG. 5).

High Concentration Pulse Detector 208 includes Buffer Amplifier 224, A.C. Coupling Capacitor 226, Hysteresis Comparator Detector 228, and F/2F Read/Decode Integrated Circuit 230.

The signal coming out of the "LOWPASS FILTER" 204 (FIG. 5) is buffered (U4A) by amplifier 224, a.c. coupled by capacitor 226, and level shifted by resistors R19 and R20. The reference voltage for the hysteresis comparator 208 is set by resistors R15 and R17. The amount of hysteresis (i.e., the upper and lower thresholds) is set by the following equation: $V(hyst)=Vcc*(R18/R18+R15\|R17))$. Therefore, as the amplitude of the saturated signal from the PMR head 200 increases and reaches the upper threshold, the output of the hysteresis detector 208 changes state (from high to low or 5 volts to 0 volts). The hysteresis detector 208 will not change state again (from low to high or 0 volts to 5 volts) until the amplitude of the saturated signal form the PMR head decreases and reaches the lower threshold. The signal out of the hysteresis comparator 208 is the F/2F recorded signal. This signal is then fed into magnetic stripe F/2 Read/Decode Integrated Circuit 230. Circuit 230 generates the data and strobe signal from the F/2F signal which is supplied to Multiplexer 212.

As an example, decoder 214 (FIG. 5) can be Intel part #50188051, Circuit 230 can be Magtek part #2100605, and Circuit 222 can be Magtek part #21006515.

Figure 10:
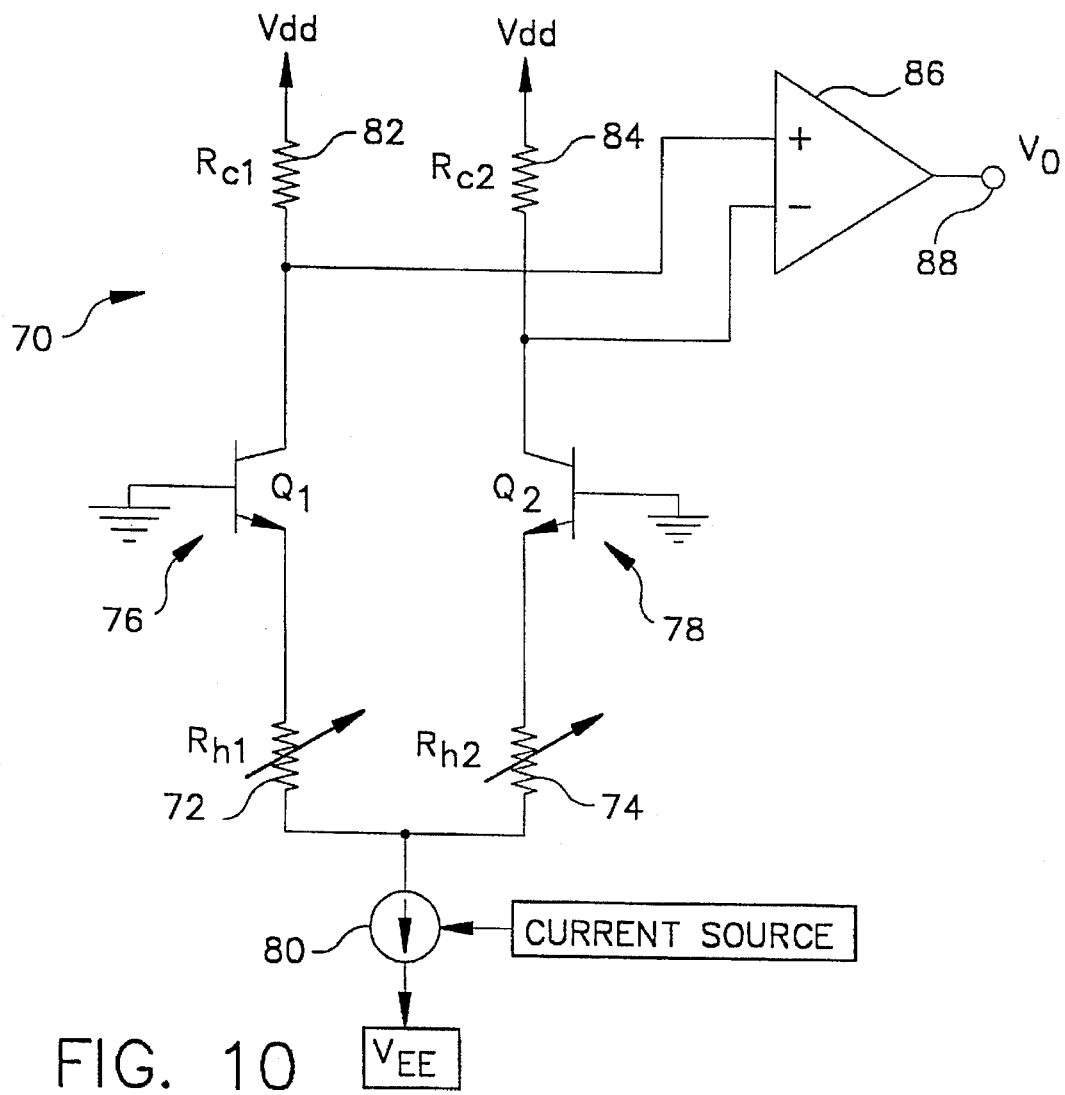

Referring now to FIG. 10, there is shown a schematic diagram of a preferred preamplifier circuit for a paired MR reproduce head (FIG. 1) to the emitters. A pair of magnetoresistive elements 72 and 74 are respectively connected between the emitters of transistors 76 and 78 and a current source 80 which is connected to a voltage $V_{EE}$. The bases of transistors 76 and 78 are electrically connected to a common voltage, e.g., electrical ground. The collectors of transistors 76 and 78 are respectively connected to a voltage source Vdd by means of resistors 82 and 84. The voltages at the collectors of transistors 76 and 78 are differentially amplified by amplifier 86 and the output signal Vo is output at terminal 88.

The common-base differential preamp 70 serves the following three purposes for the PMR head: (1) provides enough current for each element of the PMR head, (2) signal amplification, and (3) common-mode rejection. This is all accomplished with the simple design shown in FIG. 10. In low density applications, it is very critical that the thermal noise is canceled. In order to do this, the bias voltage (i.e., the transistor emitter voltage) for each of the PMR elements 72, 74 must be equal to obtain good common mode rejection. The base to emitter voltage (Vbe) of transistors 76 and 78 is approximately 0.6 volts. When referencing the base of each transistor 76, 78 to the same potential (in FIG. 10, it is connected to ground), the bias voltage at the emitter of the transistors 76, 78 is equal. Even if there are mismatches in the resistance of the PMR elements 72, 74. The bias voltages are closely matched, because the base to emitter voltage of the transistor 76, 78 is proportional to the natural logarithm of the collector current.

The invention has been described in detail with particular reference to preferred embodiments thereof, but it will be understood that variations and modifications can be effected within the spirit and scope of the invention.

What is claimed is:

1. Apparatus for sensing magnetic fields from a wide range of magnetic media, comprising:

a magneto-resistive read head for producing a signal representative of stored magnetic data; and a hysteresis comparator circuit for processing said signal produced by said magnetoresistive element.

2. The apparatus of claim 1 wherein said magnetoresistive head is a paired magnetoresistive head.

3. The apparatus of claim 1 wherein said magnetoresistive head senses a magnetic media having transitions which saturate said head.

4. A magnetoresistive head system for sensing magnetic fields from a wide range of different magnetic media comprising:

a paired magnetoresistive (PMR) head for producing a signal representative of stored magnetic data;

a high concentration pulse detector;

a low concentration pulse detector;

a multiplexer connected to said detectors; and a card detector for detecting whether said signal produced by said (PMR) head is from a high concentration media or a low concentration media and for controlling said multiplexer to pass either the signal from said high concentration pulse detector or the signal from said low concentration pulse detector.

5. The system of claim 4 wherein said high concentration pulse detector includes a hysteresis comparator circuit.

6. The system of claim 4 including a preamplifier for amplifying said signal produced by said PMR head.

7. The system of claim 6 wherein said PMR head includes first and second magnetoresistors (MRs) and wherein said preamplifier includes first and second transistors respectively connected in series with said first and second MRs, such that said bases of said transistors are connected to a common voltage.

* * * * *